INVENTOR.
ARTHUR J. WEINIG

INVENTOR.
ARTHUR J. WEINIG
BY Rollandet, McGrew & Campbell
ATTORNEYS.

Patented Aug. 26, 1941

2,253,535

UNITED STATES PATENT OFFICE 2,253,535

DIFFERENTIAL DRIVING MECHANISM

Arthur J. Weinig, Golden, Colo., assignor to Morse Bros. Machinery Company, Denver, Colo., a corporation of Colorado Application September 26, 1938, Serial No. 231,766

17 Claims. (Cl. 74—424.8)

This invention relates to improvements in differential power transmission mechanism for thickeners or the like.

Mechanism built according to this invention may also be used advantageously in combination with feeders, roasters, excavators, washers, agitators, rotary drills and similar devices.

As is well known to those skilled in the art, the rotary plows in a thickener, for instance, are subjected to variable resistance by the material being acted upon and the mechanism involved may be twisted, bent, damaged or broken if such resistance becomes too great without relief. Furthermore, after a shut-down of operation in such a device, solids may settle around and on the plows and other rotary parts of the mechanism, so that such parts must be dug out and raised or otherwise cleared before the machine can again be safely started. In plants that operate only five days per week, thickeners and other similar devices must have their mechanism or rakes manually raised after closing down or be dug out and cleared for each weekly start after the two-day shut-down.

Therefore, it is an object of this invention to provide novel mechanism that will automatically raise the rotary element in a thickener or the like to relieve or avoid resistance to its normal forward rotary movement when such resistance builds up to a predetermined degree.

Another object is to provide such a mechanism that can be selectively raised by power or by manual means.

A further object is to provide mechanism of this kind that can be raised with reverse rotation by manual means, when the power is off.

Still another object is to provide in a device of this character, a differential mechanism that will either rotate and lower the rotary element or elevate the same according to the rotative resistance to such movements, and that will rotate the element in a constant plane when the said resistances are balanced.

Still another object is to provide braking means that may be selectively applied to differential driving mechanism to optionally control the degree of resistance to the elevation of the rotary element.

A still further object is to provide a differentially driven rotary element that will return to its normal working position, by power or by gravity or by the combined influences of both, after it has been raised for a shut-down, and that has manually operable braking means to control said downward return movement.

Another object is the provision in a differential drive of this character of shearing means to predetermine the degree of difference in resistance to rotary movement and axial movement, that shall build up before differential driving of the rotary element will occur.

Still another object is to provide a differential drive for a thickener or the like that cannot be started under power, after it has been automatically raised to its upper limit due to an obstruction, until said obstruction is cleared away or removed.

A still further object of the invention is to provide means for adjusting the maximum depth to which a rake mechanism or a plow mechanism or the like will operate in devices of the above stated character.

It will be further understood that it is an object of the present differential driving mechanism that it will automatically elevate the rotary driven element of a thickener or the like to relieve or avoid resistance to its normal rotary movement, and that it will also lower said rotary driven element to its normal working position when, if and as said resistance is reduced or eliminated.

Other objects and advantages reside in details of design and construction which will be more fully disclosed in the following description and in the drawings wherein like parts have been similarly designated and in which:

Figure 1A is a fragmentary sectional view of another form of certain details shown in Figure 1;

Figure 1:
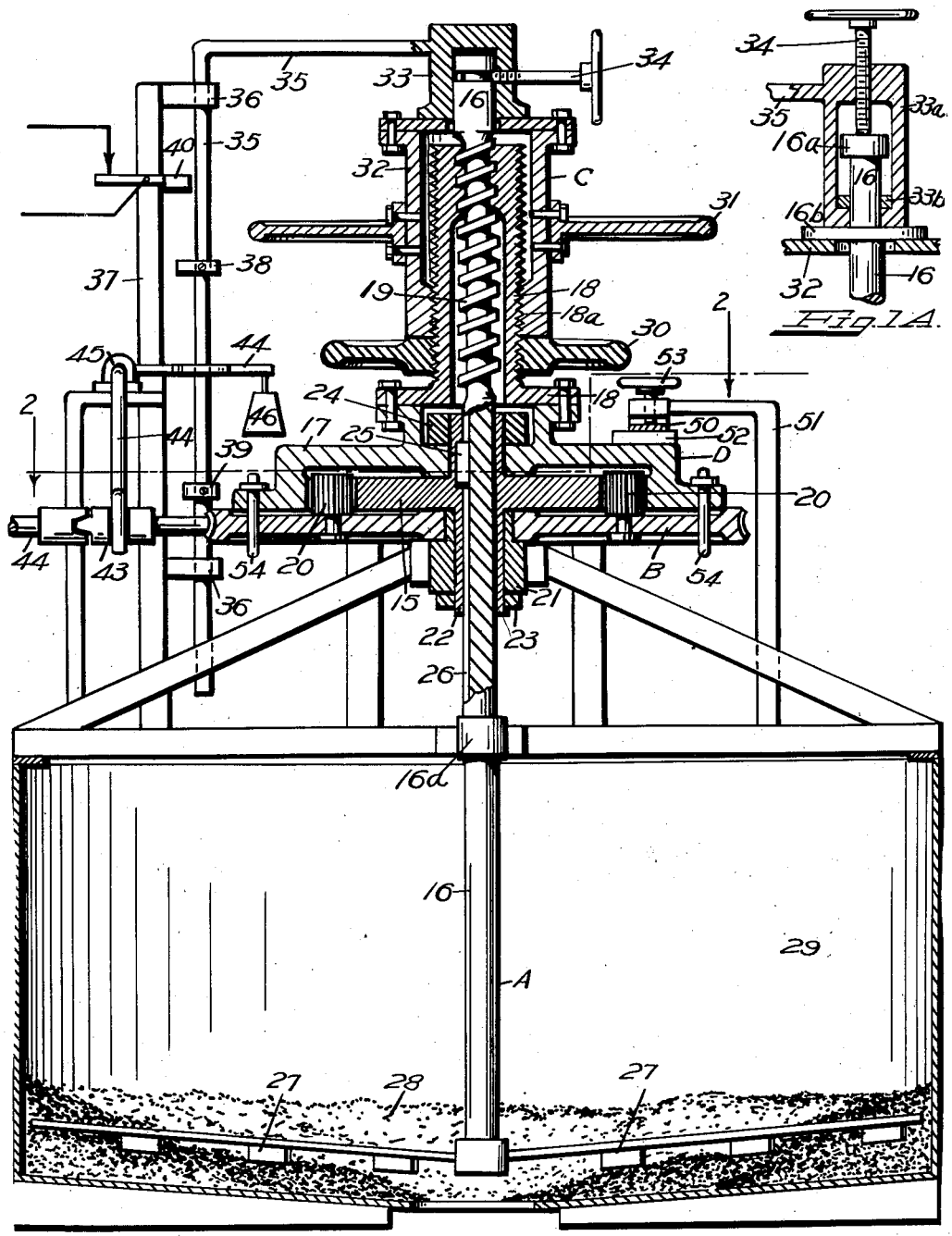
Figure 1 is a sectional view of a typical thickener, the rotary driven element of which is operated by mechanism built according to the present invention, the novel features of said mechanism being drawn to a larger scale than the thickener for purposes of clarity.

To clearly illustrate typical embodiments of this invention reference in detail will now be had to the various figures of the drawings wherein a rotary driven element that is journaled for both rotary movement and axial displacement is indicated by reference character A, a rotary drive element is indicated by B, and various forms of hoisting or elevating mechanisms for axial movement of the rotary element, are indicated broadly throughout all forms of the invention by reference character C. A differential mechanism is indicated as a whole by D which, in the preferred form shown in Figure 1, comprises a differentially driven rotary member that is positioned for rotary driving connection with a shaft 16 which is a part of the rotary driven element A, in all normal positions thereof. Shaft 16 is journaled in a suitable bearing 16a. The other side of the differential mechanism D comprises a second concentric differentially driven member 17 that is in driving connection with the elevating mechanism C through the intermediary of a yoke 18 that is in threaded screw-jack connection with threads 19 on said shaft 16.

Intermediate differential power-transmitting pinions are shown at 20, and while these are illustrated diametrically opposite for purposes of clarity, three intermediate pinions 20 are a preferred number in actual practice.

Differentially driven rotary member 15 is journaled for its normal rotary movement in a bearing 21 on its extended hub 22 and is held against axial displacement by collars 23 and 24. A key 25 transmits rotary driving force from member 15 to the shaft 16, and a key-way 26 permits relative axial movement of the shaft 16 through the hub of the rotary member 15, while maintaining said rotary driving connection. The key 25 may be securely held in the member 15 by means of screws or the like, not shown.

Rotary plows 27 are supported on and rotated by shaft 16 and are a part of the rotary driven element A which acts upon material 28 in the tank 29 in the well known thickener manner.

The yoke 18 is provided with external threads 18a that are engaged by a locking hand-wheel 30 and an elevating hand-wheel 31, the extended hub 32 of which supports a swivel collar 33 that is connected with the shaft 16 by means of a hand-screw 34. Thus the position of elevating hand-wheel 31 provides a downward limit of movement and a depth gauge for positioning the rotary driven element A.

Swivel member 33 is provided with a laterally and downwardly extending arm 35 that is guided and held against rotary movement in steady bearings 36 on a supporting arm 37. Positioned on arm 35 is an optionally movable set collar 38 and a second similar collar 39. A circuit-breaker 40 is positioned on the support 37 above the collar 38 to be contacted and operated by said collar, as will be hereinbelow explained.

Figure 2:
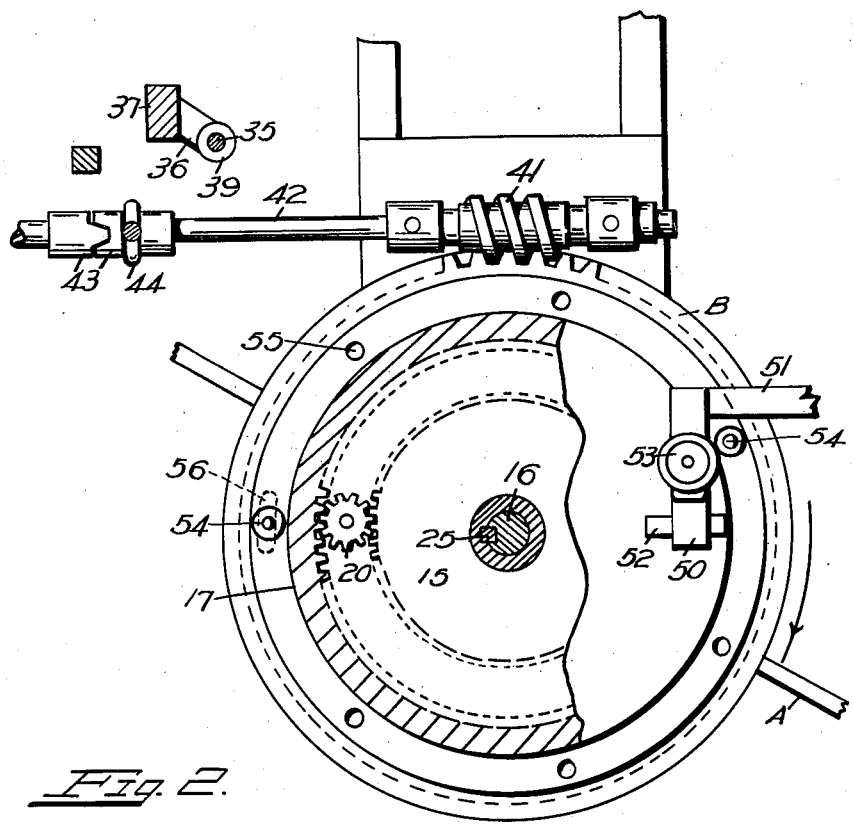
Figure 2 is a fragmentary sectional view taken approximately on the line 2—2 of Figure 1.

The rotary drive element B in the preferred form, as shown in Figures 1 and 2, is a worm gear which receives its driving power from any convenient prime mover, not shown, through the intermediary of a worm 41, a shaft 42 and a jaw clutch 43. The jaw clutch is automatically operable by means of a forked clutch arm 44 that is journaled at 45 for limited arcuate movement. A weight 46 on the other end of the arm 44 normally maintains the jaw clutch 43 in power-transmitting engagement; but when the rotary driven element A is raised to a predetermined position the set collar 39 on the arm 35 may be positioned to contact and move the clutch arm 44 to disengage the clutch and stop the power input to the mechanism.

A brake element 50 is supported on a stationary bracket 51 and is positioned to contact a ridge 52 on the rotary differential hoisting member 17. In the instant illustration, the brake element 50 is in the form of a resilient spring, the tension of which, as it bears upon the ridge 52, is manually adjustable by means of a hand-screw 53. Obviously, the brake element 50 could be in the form of a weight or any other suitable form instead of a resilient spring, as illustrated.

While but one ridge 52 has been illustrated, it will be understood that any number of ridges 52 may be provided on the differential rotary element 17 or they may be entirely omitted and the braking force applied directly to a smooth surface thereof. Furthermore, the brake could be applied along the vertical perimetrical surface of the member 17, which surface can be smooth and continuous or ridged for intermittent contact with the braking member 50.

Shear pins 54 may be optionally used to require a predetermined degree of differential resistance to rotary movement and axial movement of the rotary driven element A, to a point where the shear pins will fail before differential driving action occurs. The differential member 17 may be provided with a plurality of apertures 55 to receive pins 54, as desired, and corresponding but elongated apertures 56 may be provided in the rotary drive element B for the same purpose.

In Figure 1A the shaft 16 has a solid collar 16a and a flange 16b that rests on the hub 32 when the shaft is in its lowermost position. A swivel member 33a is provided with an inner chamber that surrounds and clears the shaft collar 16a. At the lower part of the chamber is a washer 33b around the shaft and adapted to clutch the collar 16a to stop the shaft 16 from rotation when the hand screw 34 is tightened. This will elevate the element A. The arm 35 is attached to swivel 33a and functions as set forth, and when the shaft 16 is raised by this means, to a point where power is automatically cut off, the mechanism can be again started by lowering the swivel 33a by unscrewing clamp 34.

Operation

In use, the rotary drive element B is actuated by means of its associated power input mechanism, as above set forth, and it in turn bodily rotates the intermediate differential pinions 20 about the shaft 16. The pinions transmit rotary driving force to either rotary driven member 15 which will rotate the shaft 16, or to rotary driven member 17 which will elevate the shaft 16 through the intermediary of the yoke 18 that is in threaded connection with threads 19 on said shaft. If and when the resistance to rotary movement of the shaft is balanced by resistance to the axial hoisting of the shaft, then the entire differential mechanism D and the rotary element A will rotate conjointly as one element. If and when resistance to rotary movement is less than resistance to axial movement, the differential mechanism will act to rotate the shaft 16 forwardly with reference to the member 17 and its yoke 18, in a direction to lower the element A until dynamic balance is established or until the lower limit is reached. If and when the resistance to rotary movement is greater than the resistance to axial elevation of the shaft, then the member 17 and its yoke 18 will be rotated forwardly with reference to the shaft in a direction to elevate the element A. Whether the power input to the mechanism is converted into rotary movement of the element A or into axial movement thereof between predetermined limits will be governed by the relative resistances to such movements. By the use of the braking element 50 an operator may selectively increase the resistance to the rotation of member 17 and therefore also increase the resistance to the elevation of the shaft 16 to force power input to be converted into downward rotary movement of the rotary driven element A. The shear pins 54 serve to force the differential members to rotate conjointly, up to the shearing point of the pins, if and when used.

Under all circumstances, whenever the resistance to rotation of the element A is greater than the resistance to its axial movement, the differential mechanism D will operate to move the shaft 16 axially and thereby raise element A until the rotary resistance is less than the elevating resistance. If the elevating action continues to a predetermined point the collar 38 may be set to operate the circuit-breaker 40 to thereby stop the prime mover that is driving the mechanism, or the set collar 39 may be positioned to throw out the clutch 43 as hereinabove set forth. The clutch and the circuit-breaker may both be used, or either optionally omitted, as desired.

These features of automatically stopping power input to the mechanism are similar to those shown in my copending application, Serial No. 218,621, entitled Rotary driving mechanism, and insofar as these or other features are common to both disclosures they will be claimed in the earlier one.

The hand-screw 34 may be used to resist or stop rotation of the shaft 16 to cause the differential mechanism to raise the rotary driven element A, by power. The hand-wheel 31, when locked by locking hand-wheel 30, may be used by an operator to manually resist rotation of the yoke 18 to lower element A and divert greater rotary driving force into the same.

When the power is stopped the hand-wheel 31 may be used to manually elevate the shaft 16, by turning it on the yoke threads 18a which will elevate said shaft through the intermediary of the swivel collar 33, and when such elevating action occurs the shaft 16 will rotate because of the engagement of its threads 19 with the yoke 18. When the rotary driven element A has been raised by power as by the use of the clamping hand-screw 34, and the power has been subsequently disconnected, the element A will remain in its elevated position until the clamping hand-screw 34 is again released whereupon it may rotate downwardly by gravity if its weight is sufficient to overcome friction and inertia of the moving parts, and either automatic circuit-breaker 40 or the automatic clutch control arm 44, or both, will be actuated to again start power input. In the event where light weight shaft and rakes are used and where the weight is insufficient to cause downward rotation by gravity, swivel collar 33a is constructed as shown in Figure 1A which permits a downward movement of arm 35 when the swivel is unclamped. This permits clutch and/or cut-out engagement to start the power input. The downward rotation of the rotary driven element A either by gravity or power may be optionally controlled, retarded or accelerated by use of the brake element 50, since obviously the differential member 17 will be rotated oppositely from the downwardly rotating shaft 16, when such downward rotation is due to gravity, this function being inherent in the differential mechanism when driving power is off.

As an additional safety feature it is to be noted that should the shaft be axially lifted by power to its uppermost limit due to accumulation or other obstructions in the tank, that the mechanisms cannot be started again under power until the tank obstructions are removed, because neither the shaft 16 nor the swivel member 33 or 33a can be lowered.

Thus is provided differential mechanism that will automatically rotate, lower or elevate a rotary driven element in a thickener or the like according to relative resistance to such movements, and which is further provided with manual means to selectively vary the relative resistance to such movements, and is further provided with both manual and power means for selectively elevating the rotary driven element when so desired.

The power lifting facilities are especially useful when a thickener or battery of thickeners or the like is to be shut down, because by merely setting the screw-clamp 34 the rotary element or elements A are raised free from solids in the thickener and the power input is automatically cut off until such time as operations are to be resumed, whereupon the screw-clamp 34 is released, which action alone is sufficient to automatically put the entire mechanism into normal operation. The manual labor that has been common to the operation of thickeners and like devices, is thus greatly reduced for the usual attendants.

In the differential drive shown in the preferred form, Figures 1 and 2, it will be seen that the intermediate differential gears 20 engage the rotary driven differential member 17 on a pitch diameter that is considerably greater than is the pitch diameter of the rotary differential driven member 15. Therefore, since both of the members, 15 and 17, are mounted for rotary movement about a common axis of rotation there is a considerable difference in the angular movement imparted to the inner differential member 15 from that imparted to the outer differential member 17, by a given number of rotations of the intermediate gears 20, about their respective axes.

For purposes of automatically or selectively raising the rotary element A, a screw-thread 19 on the shaft 16 of any suitable pitch or lead angle, may be used. However, as shown in Figure 1, a screw-thread 19 of a relatively large lead angle is preferred as giving more rapid response in the elevating function of the mechanism and as facilitating gravitational return with rotation of the rotary driven element A when released from an elevated position.

Figure 3:
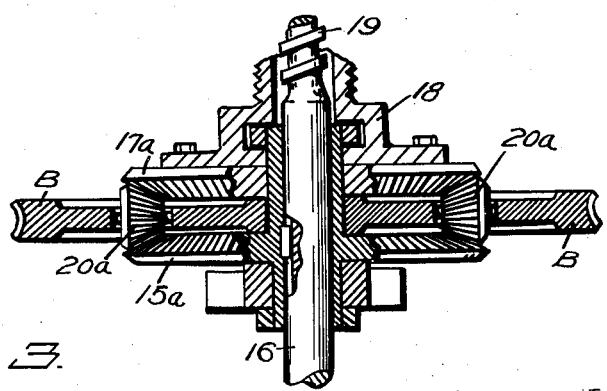
Figure 3 is a fragmentary sectional view illustrating a modified embodiment of the invention.

In Figure 3 the differentially driven member 15a that imparts rotary movement to the shaft 16, and the second differentially driven member 17a that imparts axial or hoisting movement to the shaft 18, are in the form of bevel gears having the same pitch diameters. The intermediate differential pinions 20a are, of course, of the bevel type to correspond with the gears with which they mesh, and while two bevel pinions 20a are shown diametrically opposite, three pinions are preferred. The pinions are journaled for rotation in the rotary drive element B. Obviously, this arrangement can readily be coordinated with the other parts of the mechanism, as illustrated in Figures 1 and 2, and it will operate as above described.

Figure 4:
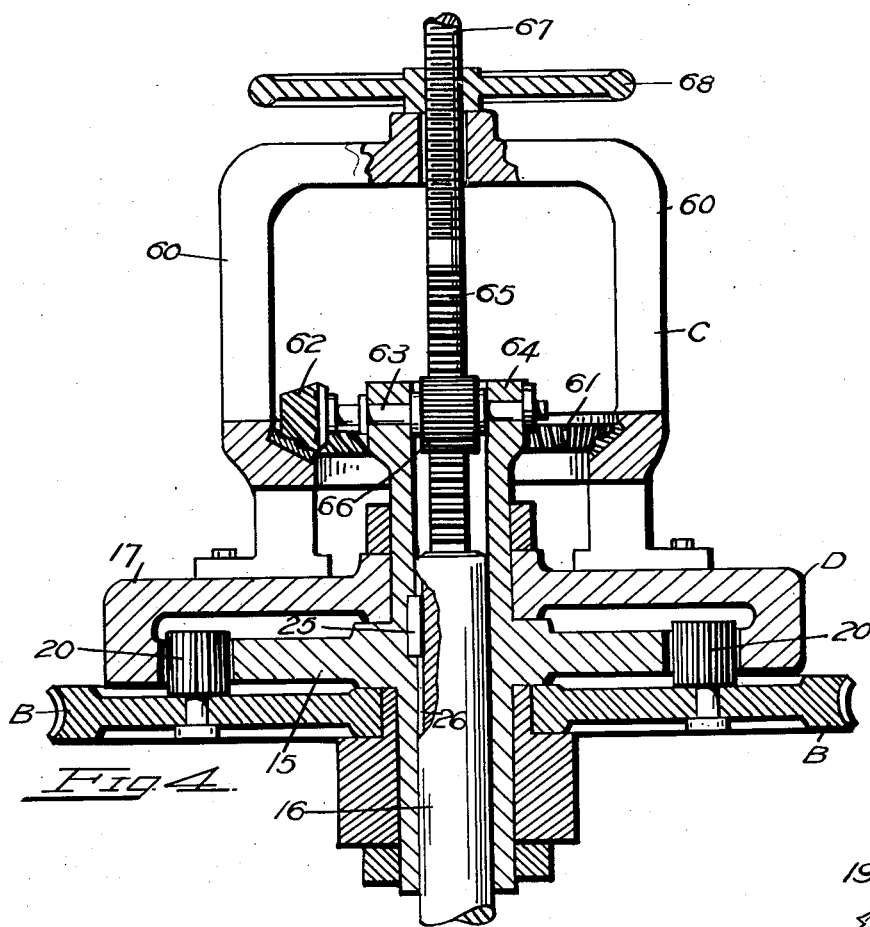
Figure 4 is a fragmentary sectional view illustrating another form of the invention.

Figure 4 illustrates a modified embodiment of the invention wherein the shaft 16, the rotary drive element B, the differentially driven members 15 and 17, may all be substantially the same, as hereinabove described in connection with Figures 1 and 2. However, in this form of the invention the hoisting or elevating element C comprises a yoke 60 that is mounted for conjoint rotation with the differentially driven member 17, as clearly illustrated. The yoke 60 carries an internal spiral bevel gear 61 that meshes with a corresponding pinion 62 on a shaft 63 that is journaled in extended hub 64 of the differentially driven member 15.

The main shaft 16 is provided with a gear rack 65 instead of screw-thread 19 as shown in Figure 1. As illustrated, the upper part of the shaft 16 may be of smaller diameter or this portion of the shaft may be made separate from shaft 16 and attached thereto by any convenient means. A spur pinion 66 on the shaft 63 is mounted to mesh with the gear rack 65, and above the rack is a threaded section 67 that is also a part of or attached to the main shaft 16. A hand-wheel 68 engages the threaded part 67 of the shaft and thrusts against the yoke 60 so that the shaft 16 and the entire rotary driven element A may be manually raised by said hand-wheel 68.

Obviously, the differential mechanism D in the form as shown in Figure 4 will function to operate the hoisting or elevating mechanism C in this form when resistance to normal rotation of shaft 16 so demands. The rotation of the yoke 60 and the gear 61 will turn the pinion 62 and the shaft 63 to drive the spur pinion 66 to raise or lower the shaft 16 and the entire rotary driven element A. The features of selectively raising by power the shaft 16, as illustrated in Figures 1 and 2, may obviously be combined with the automatic hoisting mechanism C in the form shown in Figure 4, and upon release from an elevated position, the rotary driven element A, including the shaft 16, will descend by gravity or under power with rotary motion, and the yoke 60 will rotate in a direction opposite to the shaft, if the return is by gravity. All other features of Figures 1 and 2 can be used with the elevating element of Figure 4.

Figure 5:
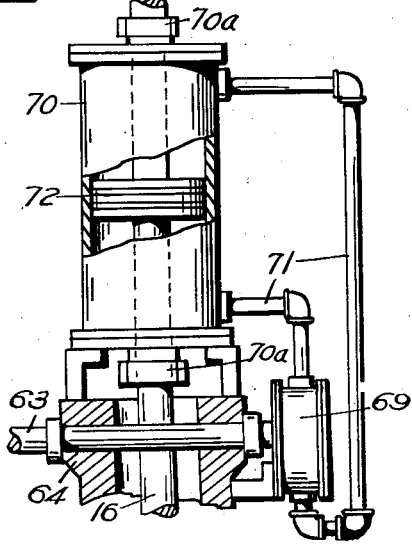
Figures 5 and 6 are fragmentary sectional views illustrating other changes in details of construction that may be made within the spirit and scope of the appended claims.

Figure 5 represents a change in the general form of the hoisting mechanism, hereinabove described and illustrated in Figure 4. Here the shaft 63, being driven by the same mechanism as shaft 63 in Figure 4, is connected to rotate a reversible gear-type force-pump 69 which is connected with a hydraulic cylinder 70 by means of a suitable conduit system 71. Shaft 16, preferably reduced in size at its upper portion, is provided with a piston element 72 that is suitably mounted in the hydraulic cylinder 70 for reciprocatory movement therein. The cylinder 70 is provided with suitable packing glands 70a around the portion of the shaft 16 that enters the cylinder.

It will be readily understood that when the cylinder 70, the conduit system 71 and the force-pump 69 are filled with a liquid, the rotation of the shaft 63 will function to raise or lower the piston 72 according to the direction of the rotation of said shaft 63 and its associated force-pump 69. The other features of Figures 1 and 2 can be combined with the hoisting element of Figure 5.

Figure 6:
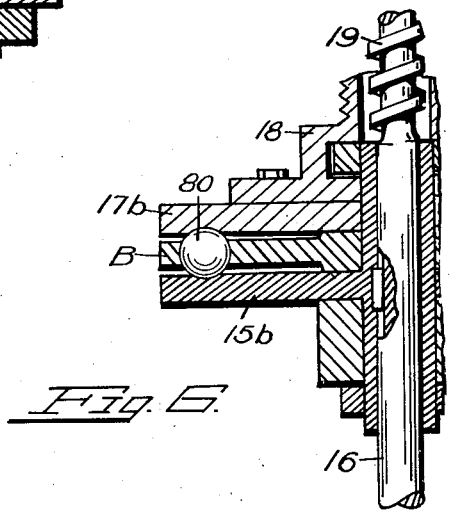

In Figure 6 is illustrated the possibility of substituting balls 80 in place of intermediate differential pinions 20, which will differentially drive the respective driven members 17b and 15b by friction. Any convenient number of balls 80 may be used but three is the preferred number. The rotary drive element B, in this arrangement, serves as a cage for the balls, while the differentially driven members 17b and 15b are provided with suitable races. Rollers may be used instead of balls 80 and will function in a similar manner.

A particular advantage in the present construction is that a minimum of head room above the thickener tank is required. While in Figure 1 an A frame superstructure is illustrated, it will be understood that the main bearing 21 could be mounted directly on a horizontal beam immediately above the top of the tank 29 to further reduce the head room required for the mechanism. Such an arrangement is made possible because substantially all mechanism is above the bearing 21. The vertical compactness of the arrangement shown in Figure 1 is highly advantageous in practical installation and is largely accomplished by the arrangement in which the yoke 18 is externally threaded for engagement by the manually operable elevating hand-wheel 31.

As above pointed out the improved mechanism herein disclosed may be used in combination with devices other than thickeners where a rotary driven element is subject to variable resistance to its rotary movement. In the case of an excavator the breaking element 59 is particularly advantageous in combination with the disclosed mechanism because an operator may manually direct the degree of digging and rotary driving force that is utilized by the rotary driven element.

While this specification discloses preferred means for reducing the present invention to practice and a preferred embodiment of the invention, changes may occur to those skilled in the art and may be made within the scope of the appended claims, without departing from the spirit of the invention.

What I claim and desire to secure by Letters Patent is:

1. Rotary mechanism for a thickener or the like, comprising a driven element journalled for rotation and for axial movement, a rotary drive element, elevating mechanism operatively connected with said driven element, and differential power-transmission mechanism connecting the drive element with said driven element and with said elevating mechanism differentially to transmit rotary driving force to said driven element or to actuate the elevating mechanism according to the relative resistance to rotary movement or to axial movement of said driven element.

2. Rotary mechanism for a thickener or the like, comprising a driven element journalled for rotation and for axial movement, a rotary drive element, elevating mechanism operatively connected with said driven element, differential power-transmission mechanism connecting the drive element with said driven element and with said elevating mechanism differentially to transmit rotary driving force to said driven element or to actuate the elevating mechanism according to the relative resistance to rotary movement or to axial movement of said driven element, and means positioned and adapted selectively to vary the resistance to one of such movements.

3. Rotary mechanism for a thickener or the like, comprising a driven element journalled for rotation and for axial movement, a rotary drive element, rotary elevating mechanism operatively connected with said driven element, differential power-transmission mechanism connecting the drive element with said driven element and with said elevating mechanism differentially to transmit rotary driving force to said driven element or to actuate the elevating mechanism according to the relative resistance to rotary movement or to axial movement of said driven element, and means positioned and adapted intermittently to retard rotation of said elevating mechanism.

4. Rotary mechanism for a thickener or the like, comprising a driven element journalled for rotation and for axial movement, a rotary drive element, rotary elevating mechanism operatively connected with said driven element, differential power-transmission mechanism connecting the drive element with said driven element and with said elevating mechanism differentially to transmit rotary driving force to said driven element or to actuate the elevating mechanism according to the relative resistance to rotary movement or to axial movement of said driven element, and a friction brake positioned and adapted selectively to resist rotation of the elevating mechanism.

5. Rotary mechanism for a thickener or the like, comprising a driven element having a threaded shaft journalled for rotation and for axial movement, a rotary drive element, rotary elevating mechanism inclusive of a jack screw engaging the threads of said shaft, connected with said driven element, and differential power-transmission mechanism connecting the drive element with said driven element and with said elevating mechanism differentially to transmit rotary driving force to said driven element or to actuate the screw of the elevating mechanism according to the relative resistance to rotary movement or to axial movement of said driven element.

6. Rotary mechanism for a thickener or the like, comprising a driven element inclusive of a shaft having a rack and journalled for rotation and for axial movement, a rotary drive element, elevating mechanism inclusive of a driven pinion meshing with said rack, connected with said driven element, and differential power-transmission mechanism connecting the drive element with said driven element and with said elevating mechanism differentially to transmit rotary driving force to said driven element or to drive the elevating pinion according to the relative resistance to rotary movement or to axial movement of said driven element.

7. Rotary mechanism for a thickener or the like, comprising a driven element journalled for rotation and for axial movement, a rotary drive element, elevating mechanism connected with said driven element and comprising a hydraulic jack and a hydraulic pump operatively connected therewith, and differential power transmission mechanism connecting the drive element with said driven element and with the pump of said elevating mechanism differentially to transmit rotary driving force to said driven element or to operate the elevating pump according to the relative resistance to rotary movement or to axial movement of said driven element.

8. In rotary mechanism, for a thickener or the like, an upstanding shaft journaled for rotation and for axial movement, a rotary drive element, a differentially driven rotary member operatively connected to rotate said shaft, elevating mechanism for the shaft, another differentially driven rotary member operatively connected to actuate said elevating mechanism and positioned concentrically with the first said differentially driven rotary member, and an intermediate differential member driven by the rotary drive element and engaging the said driven rotary members at different radial distances from their common axis of rotation, thereby effecting differential transmission of driving power thereto according to the relative resistances to their respective said rotary movements.

9. In a drive for a thickener or the like, an upstanding shaft journaled for rotation and for axial movement, a rotary drive element, a differentially driven rotary member operatively connected to rotate said shaft, hoisting mechanism for the shaft, another differentially driven rotary member operatively connected to actuate said hoisting mechanism and positioned concentrically with the first said differentially driven rotary member, and an intermediate differential member driven by the rotary drive element and engaging the said driven rotary members at the same radial distance from their common axis of rotation, thereby effecting differential transmission of driving power thereto according to the relative resistances to their respective said rotary movements.

10. In a drive for a thickener or the like, a shaft journaled for rotation and for axial displacement, a rotary drive element, a member differentially driven by said drive element and positioned for rotary driving connection with said shaft in all normal positions of the latter, lifting mechanism for the shaft, another rotary member differentially driven by the drive element and connected to move the shaft axially through the intermediary of said lifting mechanism, and a shear member connecting the last said differentially driven member with the rotary drive element whereby to effect their conjoint rotation until failure of said shear member.

11. In a drive for a thickener or the like, a shaft journaled for rotation and for axial displacement, a rotary drive element, a member differentially driven by said drive element and positioned for rotary driving connection with said shaft in all normal positions of the latter, lifting mechanism for the shaft, another rotary member differentially driven by the drive element in superposed relation thereto and connected to move the shaft axially through the intermediary of said lifting mechanism, and a shear pin connecting the last said differentially driven member with the rotary drive element whereby to effect their conjoint rotation until failure of said shear pin.

12. In a drive for a thickener or the like, an upstanding shaft journaled for rotation and for axial movement, a rotary drive element, a differentially driven rotary member operatively connected to rotate said shaft, hoisting mechanism for the shaft, another differentially driven rotary member operatively connected to actuate said hoisting mechanism and positioned concentrically with the first said differentially driven rotary member, and an intermediate rolling friction member driven by the rotary drive element and engaging the said driven rotary members, thereby effecting frictional differential transmission of driving power thereto, according to the relative resistances to their respective said rotary movements.

13. In a drive for a thickener or the like having an element journaled for both rotary and axial movement, and having a differential power-transmitting mechanism adapted to differentially transmit power for rotary and axial movement thereto according to the relative resistance to such movements, a clamp adapted to selectively hold the rotary element from rotation to thereby direct power-input into upward axial movement thereof, and means for limiting said axial movement.

14. In a drive for a thickener or the like having an element inclusive of a threaded shaft journaled for both rotary and axial movement, a differential mechanism for transmitting power differentially for effecting such movements according to the relative resistance to the respective movements, the said power axial movement being effected by the differential mechanism through the intermediary of a rotary yoke in internal screw-jack engagement with the threaded shaft, the yoke also having external threads, and a manually operable member in screw engagement with the external threads of said yoke and connected with the shaft for selective manual axial movement thereof.

15. In a power transmission drive for a thickener or the like, having a differentially driven element mounted for two-way axial movement and for rotation, an axially movable clamping element engageable with the driven element whereby its rotary movement is resisted and power input is directed into upward axial movement of said driven element and conjoint axial movement of said clamping element, a power cut-out controlled by said movement of the clamping element, and means to lower said clamping element independently of the driven element.

16. Rotary mechanism for a thickener or the like, comprising a threaded upright shaft journalled for both rotation and for axial movement, a power-transmitting drive element positioned for rotation about said shaft, a driven gear slidably keyed to the shaft for rotating the same, an internal gear surrounding said driven gear and radially spaced therefrom, an intermediate pinion journalled for rotation upon the power-transmitting driving element and meshing with and between the two said gears, an internally threaded yoke secured to the internal gear and engaging the threads of said shaft the yoke being also externally threaded, and a hand-wheel in threaded engagement with the external threads of the yoke and connected with the shaft for determining its axial position.

17. Rotary mechanism for a thickener or the like, comprising a threaded upright shaft journalled for both rotation and for axial movement, a power-transmitting drive element positioned for rotation about said shaft, a driven gear slidably keyed to the shaft for rotating the same, an internal gear surrounding said driven gear and radially spaced therefrom, an intermediate pinion journalled for rotation upon the power-transmitting driving element and meshing with and between the two said gears, an internally threaded yoke secured to the internal gear and engaging the threads of said shaft the yoke being also externally threaded, a hand-wheel in threaded engagement with the external threads of the yoke and connected with the shaft for determining its axial position, and means carried on the yoke for locking said hand-wheel in selected positions with reference to the yoke.

ARTHUR J. WEINIG.